(12) United States Patent
Banga

(10) Patent No.: US 8,307,055 B2
(45) Date of Patent: Nov. 6, 2012

(54) SECURE PLATFORM MANAGEMENT DEVICE

(75) Inventor: Gaurav Banga, Cupertino, CA (US)

(73) Assignee: Absolute Software Corporation, Vancouver (CA)

( * ) Notice: Subject to any disclaimer, the term of this patent is extended or adjusted under 35 U.S.C. 154(b) by 115 days.

(21) Appl. No.: 12/321,503

(22) Filed: Jan. 21, 2009

(65) Prior Publication Data
US 2009/0187655 A1 Jul. 23, 2009

Related U.S. Application Data

(60) Provisional application No. 61/011,852, filed on Jan. 22, 2008.

(51) Int. Cl.
G06F 15/177 (2006.01)
(52) U.S. Cl. ........................................................ 709/222
(58) Field of Classification Search .................. 709/228, 709/229, 220–222
See application file for complete search history.

(56) References Cited

U.S. PATENT DOCUMENTS

| 7,003,563 | B2* | 2/2006 | Leigh et al. ................... 709/223 |
| 7,178,025 | B2 | 2/2007 | Scheidt et al. |
| 7,302,571 | B2 | 11/2007 | Noble et al. |
| 2003/0014660 | A1* | 1/2003 | Verplaetse et al. ............ 713/200 |
| 2003/0135766 | A1* | 7/2003 | Zyskowski et al. ........... 713/300 |
| 2004/0064720 | A1* | 4/2004 | Hessel et al. .................. 713/200 |
| 2005/0090267 | A1* | 4/2005 | Kotzin ........................ 455/456.4 |
| 2005/0289355 | A1* | 12/2005 | Kitariev et al. ................ 713/182 |
| 2006/0224754 | A1* | 10/2006 | Jain et al. ....................... 709/230 |
| 2006/0262743 | A1* | 11/2006 | Kalhan et al. .................. 370/328 |
| 2007/0152058 | A1* | 7/2007 | Yeakley et al. ........... 235/462.01 |
| 2007/0168582 | A1* | 7/2007 | Huang et al. .................... 710/36 |
| 2008/0014869 | A1 | 1/2008 | Demirabasa et al. |
| 2008/0207182 | A1* | 8/2008 | Maharajh et al. ........... 455/414.1 |
| 2009/0061781 | A1* | 3/2009 | Zhang .......................... 455/66.1 |
| 2009/0154778 | A1* | 6/2009 | Lei et al. ........................ 382/112 |
| 2009/0163216 | A1* | 6/2009 | Hoang et al. .................. 455/450 |
| 2011/0035491 | A1* | 2/2011 | Gelvin et al. .................. 709/224 |

OTHER PUBLICATIONS

International Preliminary Report on Patentability of Jul. 22, 2010 in International Application PCT/US09/00479.
International Search Report of Mar. 9, 2009 in International Application PCT/US09100479.
Written Opinion of Mar. 9, 2009 in International Application PCT/US09/00479.

* cited by examiner

Primary Examiner — Jason Recek
(74) Attorney, Agent, or Firm — Brokaw Patent Law PC; Christopher J Brokaw

(57) ABSTRACT

A platform management device configured to control the functionality of a provisioned electronic device is disclosed. The platform management device includes a processor operative to execute commands. A memory maintains a series of instructions that when executed by the processor, causes the processor to: (1) establish a connection with a corresponding electronic device; and (2) transfer operating parameters to the corresponding electronic device, such that access to and operation of the electronic device may be controlled. Examples of device control include denying access to an unauthorized user and forcing the electronic device into a disabled state by remote operation from an authorized user.

20 Claims, 4 Drawing Sheets

SECURE PLATFORM MANAGEMENT DEVICE

RELATED APPLICATION

This application claims the benefit of U.S. Provisional Application Ser. No. 61/011,852, filed on Jan. 22, 2008.

FIELD OF THE INVENTION

The present invention generally relates to electronic devices and, more particularly, to a platform management device that provides for the secure connection and control of a corresponding provisioned electronic device.

BACKGROUND OF THE INVENTION

Electronic devices, for example, laptop computers, palmtop computers, personal digital assistants, cellular communications devices, point of sales machines and other suitable devices and combinations thereof have become an integral component in the mobile work force. Where personnel were once limited to working at a desktop or other static location, the advent of laptop computers and other mobile personal computing devices has made mobile computing the rule and not the exception. Mobility, though, has its disadvantages. First, lost and/or stolen computers have greatly increased the amount of sensitive information that has been placed into the public domain. An unfortunate by-product of such information loss has been the increase of identity theft over the past several years.

Additionally, the tremendous decrease in productivity resulting from the user reporting the lost/stolen computer incident, replacing and configuring a replacement system to equal that of the previous computer, potentially having to perform many projects for a second, third or more times and taking steps to ensure their identity has not been stolen, for example, reporting the incident to banks, credit card companies, credit bureaus and other corresponding organizations results in potentially millions of dollars in lost productivity time that companies and individuals cannot get back. As a result of the increasing incidents of lost/stolen computers, efforts have been undertaken to reduce the potential risks associated with such lost/stolen computers.

One such effort has been to equip computers, in particular laptop computers, with global positioning system (GPS) transponders that periodically send a signal to a monitoring station, such that the location of the computer can either be monitored or quickly determined. Additionally, the computer may be configured such that if the computer has not been used for a predetermined period of time, the unit will shut down and require the possessor of the unit to enter a password or provide some other form of authentication before returning to a full power or active state.

A drawback associated with the positioning solution is that it may require the computer to have an active network connection, for example, the Internet. If the lost/stolen computer is located within a building or in an underground structure, a network connection may not, and is often not, available. A drawback associated with the timeout solution is that it may be fairly easy to circumvent the protection by removing or turning off the corresponding timing hardware (e.g. counter) from the underlying system. Alternatively, the current unauthorized possessor of the computer may have obtained the password of the authorized owner or user of the computer without permission or knowledge of the authorized user; thereby, allowing unauthorized access to the computer.

SUMMARY OF THE INVENTION

A platform management device controls whether a provisioned electronic device, for example, a laptop computer may be used by a person in possession of the laptop. Additionally, the platform management device provides other capabilities, for example, security, identity, storage and location that may prove useful to the user. Security may be provided, for example, by allowing access only to a user that has possession of the management device. The platform management device may be inserted into an available USB or other suitable port, which causes the provisioned laptop to be enabled. If the inserted platform management device is not provisioned or corresponds to the laptop in which it has been inserted, the laptop will remain disabled; thereby, preventing unauthorized access to the laptop. In a disabled system, the firmware of the laptop prevents the functioning of the underlying hardware subsystems and components; thus, no software can execute.

Identification of an authorized user may be provided, for example, by physical possession and fingerprint or other biometric recognition. In application, the user or possessor of the platform management device will have to establish authorization by swiping their finger over a biometric reader. If the fingerprint is not recognized or otherwise authorized, the platform management device will not become active; thereby, preventing the laptop to which the management device is provisioned to operate.

Storage is provided by the platform management device in that it includes, for example, flash memory for storage of data. Such storage may be used as part of a backup and recover system. Optionally, if the platform management device is not provisioned for a particular device, the entire device may be used as memory.

Location capability is provided by the platform management device being able to store and transmit location information over an applicable network. Such location information may take the form of a GPS location signal. If a network is not available, the last known location of the platform management device and a corresponding provisioned laptop is stored in the platform management device, and may be obtained from device memory when the platform management device is connected to a suitable electronic device.

An advantage provided by the present invention is that it provides two factor authentication before a laptop computer may be operated.

Another advantage provided by the present invention is that a provisioned laptop may be controlled from a remote location.

A feature provided by the present invention is that access to sensitive information may be prevented by remotely disabling a provisioned laptop when such device is not in the possession of an authorized user.

BRIEF DESCRIPTION OF THE DRAWINGS

The aforementioned and related advantages and features of the present invention will become better understood and appreciated upon review of the following detailed description of the invention, taken in conjunction with the following drawings, where like numerals represent like elements, in which.

DETAILED DESCRIPTION OF THE INVENTION

Figure 1:
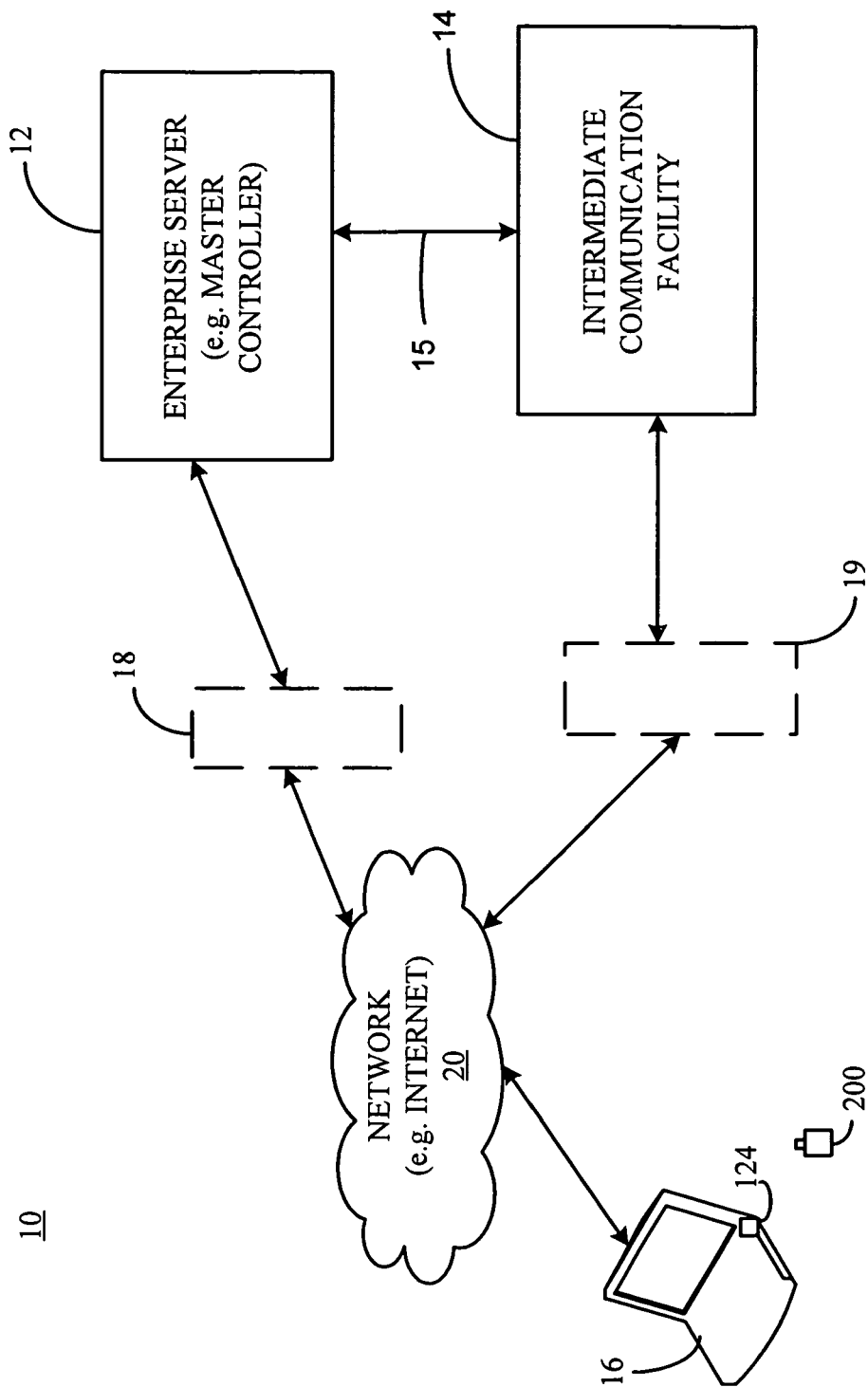
FIG. 1 is a schematic block diagram of a network architecture where one or more remote electronic devices are configured with the platform management device of the present invention.

An exemplary embodiment of the present invention will now be described with reference to FIGS. 1-4. FIG. 1 is a schematic block diagram of a network architecture 10 configured to employ and use the platform management device according to the present invention. As shown, the network 10 includes an enterprise server 12, an intermediate communication facility 14 and one or more electronic devices 16, for example, a laptop computer that may remotely communicate with the enterprise server 12 via a network 20, for example, the Internet. In application, the one or more electronic devices 16 communicates with the enterprise server 12 through corresponding firewalls 18, 19 that are present between the enterprise server 12 and the one or more electronic devices 16.

The enterprise server 12 may be implemented as one or more servers that contain and transmit the use policies associated with the corresponding electronic devices 16. Each of the electronic devices 16 may be used by employees or authorized personnel of an enterprise that owns the enterprise server 12. Each of the electronic devices 16 and enterprise server 12 includes communication facilities, for example, a transceiver that allows for communication between the enterprise server 12 and the one or more electronic devices 16. The architecture and functionality of the one or more electronic devices 16 will be described in greater detail with reference to FIG. 2.

The intermediate communication facility 14 may be implemented as one or more servers that house the communication, use policies and data protocols of one or more enterprises, such that a plurality of companies (each of which owns one or more enterprises servers 12) may communicate with their remote workforce via the electronic devices 16. In application, data and other suitable information exchange between the one or more enterprise servers 12 and the intermediate communication facility 14 is provided by a communication link 15. The communication link 15 may be implemented as a wired communication link or a wireless communication link.

The one or more electronic devices 16 may be laptop computers, desktop computers, palm top computers, mobile communication devices, for example, cellular telephones or other suitable devices and combinations thereof. The one or more electronic devices 16 are configured with specialized firmware, referred to as platform management firmware 132 (FIG. 2) that operates in conjunction with a platform management device 200 to provide authorized, secure operation of the electronic device 16 as well as for more secure communication with a corresponding enterprise server 12. In application, communication between the one or more electronic devices 16 and the enterprise server 12 may be performed through one or more firewalls 18, 19. In some applications, the firewalls 18, 19 will not be necessary.

Figure 2:
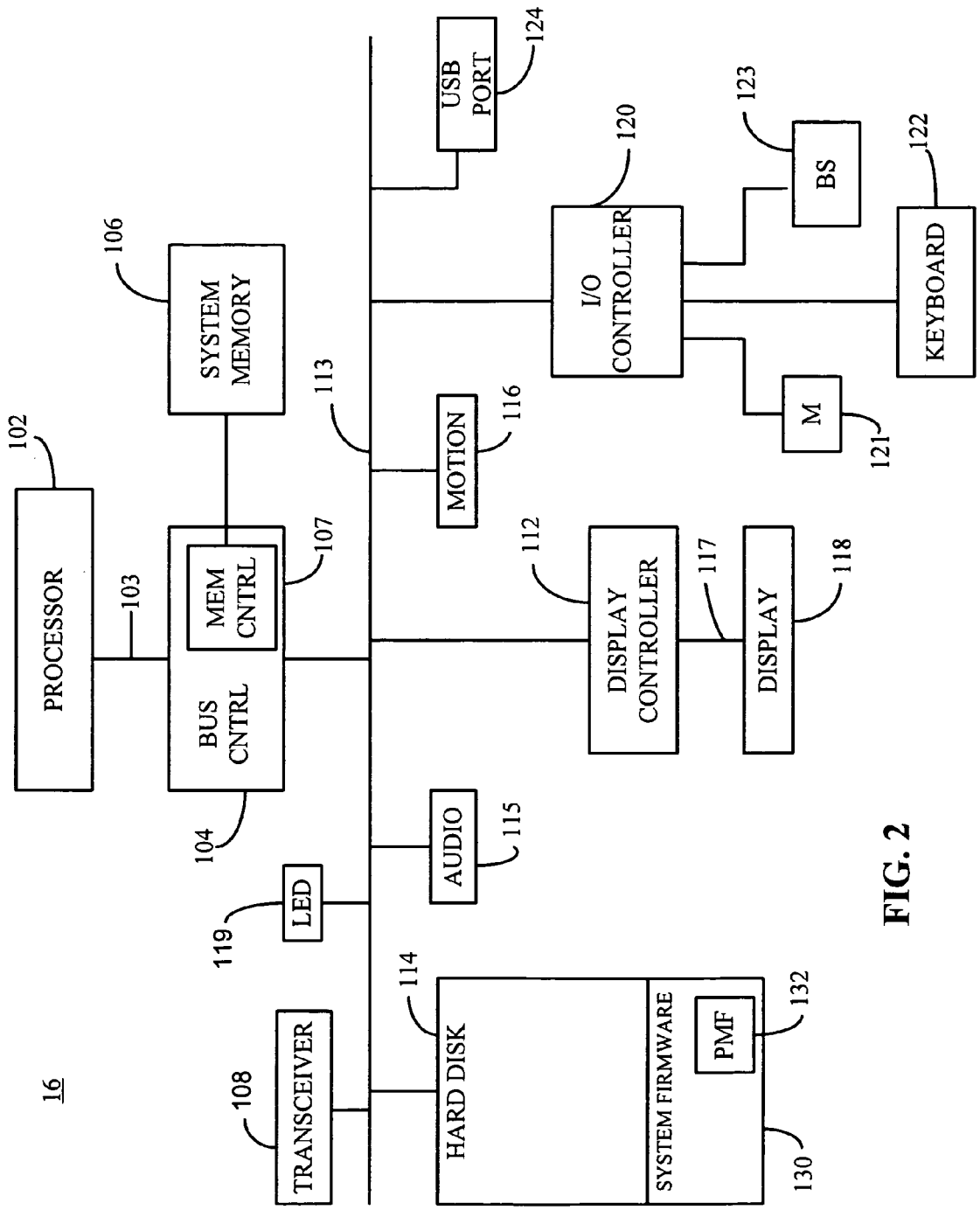
FIG. 2 is a schematic block diagram of an electronic device configured to work in conjunction with the platform management device of the present invention.

FIG. 2 is a schematic block diagram of an exemplary electronic device 16 configured to work in conjunction with the platform management device of the present invention. For purposes of illustration and not limitation, the electronic device 16 is implemented as a laptop computer. However, it will be appreciated by those of ordinary skill in the art, that the electronic device 16 may be implemented as a desktop PC, a tablet PC, a palmtop PC, a PDA, wireless communication device, for example, a cellular telephone, printing devices or other suitable devices or combination thereof. The laptop 16 includes at least one controller or processor 102, configured to control the overall operation of the laptop 16.

The processor 102 may include an arithmetic logic unit (ALU) for performing computations, one or more registers for temporary storage of data and instructions, and a controller for controlling the operations of the laptop 16. In one embodiment, the processor 102 includes any one of the x86, Pentium™, and PentiumPro™ microprocessors manufactured by Intel Corporation, or the K-6 microprocessor marketed by Advanced Micro Devices. The processor 102 is not limited to microprocessors, but may take on other forms such as microcontrollers, digital signal processors, dedicated hardware (e.g. ASIC), state machines or software executing on one or more processors distributed across a network.

One of the functions performed by the processor 102 is to cause the system firmware 130 of the laptop 16 to disable the corresponding laptop 16 when the platform management device 200 (FIG. 3) is out of transmission range of the laptop 16. This may be accomplished, for example, by the processor 102 measuring the strength of the signal being transmitted between connected devices. If the signal strength is below a predetermined threshold, the processor 102 sends a signal to the firmware 130 which causes the firmware 130 to stop the functioning of the underlying device (e.g. laptop), as well as sends a signal to the audio device 115 which causes the audio device 115 to generate three beeps alerting the user of the out of range condition. A comparable signal is sent to the platform management device 200, via transducer 108; thereby, causing the speaker 215 of the platform management device 200 to provide an out of range warning.

The processor 102 is coupled to a bus controller 104 by way of a CPU bus 103. The bus controller 104 includes a memory controller 107 integrated therein. In an alternate embodiment, the memory controller 107 may be separate from the bus controller 104. The memory controller 107 provides an interface for access by the processor 102 or other devices to system memory 106, for example, synchronous dynamic random access memory.

The bus controller 104 is coupled to a system bus 113, for example a peripheral component interconnect (PCI) bus, industry standard architecture (ISA) bus, a wireless connection or other suitable communication medium. Coupled to the system bus 113 is a transceiver 108, a display controller 112, operative to transfer data 117 for display on a corresponding display device 118, for example, a monitor or computer screen, a hard disk 114, an audio device 115, for example, a speaker, motion detector 116, for example, an accelerometer, a visual indication device 119, for example, a light emitting diode (LED), an input/output (I/O) controller 120 and a USB or smart card reader port 124.

The transceiver 108 may be any suitable device capable of transmitting and receiving data and information over an applicable communication network. For example, the transceiver 108 may be a USB-based communication device, or a Bluetooth enabled device capable of providing a connection to a Bluetooth network and sending and receiving information thereon. Other data link connection protocols, for example, RFID may also be employed or otherwise utilized by the transceiver 108.

The hard disk 114 may be any suitable non-volatile memory, for example, flash memory. The hard disk 114 maintains the system firmware 130, for example, the BIOS software or other suitable core system software of the laptop 16. The firmware 130 is responsible for, among other things, initializing and configuring the various hardware subsystems, for example, display controller 112, motion sensor 116, Input/Output (I/O) controller 118 or other suitable device or series of devices present within, controlled by or otherwise coupled to the laptop 16, and initiates the operating system (OS) boot process. Within the system firmware 130, is platform management firmware (PMF) code 132 that is used to communicate with and enable the functionality of a platform management device 200 (FIG. 3) that may be associated with the laptop 16. The functionality of the platform management device and its underlying firmware will be described in greater detail below.

In addition, the system firmware 130 may be stored in a processor readable medium or transmitted by a computer data signal embodied in a carrier wave over a transmission medium or other suitable communication link. The processor readable medium may include any medium that can store or transfer information, for example, an electronic circuit, a semiconductor memory device, a ROM, a flash memory, an erasable programmable ROM (EPROM), a floppy diskette, a CD-ROM, an optical disk, a fiber optic medium, a radio frequency (RF) link or other suitable medium. The computer data signal may include any signal that can propagate over a transmission medium, for example, electronic network channels, optical fibers, air electromagnetic, RF links, or other suitable transmission medium. The code segments may be downloaded via computer networks, for example, the Internet, an intranet, LAN, WAN or other suitable network or combinations thereof.

An audio module 115 may be implemented, for example, by a speaker or other suitable device capable of providing an audible warning to the user. In application, the audio module 115 will become active (e.g. provide a beep or other suitable warning) when the laptop 16 is moved during an unauthorized period, as will be discussed in greater detail below. The audio module 115 also provides an indication of the operational status of the laptop computer 16. For example, a single beep indicates that the laptop 16 is disabled. Two beeps indicate that the laptop 16 is enabled. This may occur, for example, after a good fingerprint or other biometric value is received by the laptop 16, if the laptop was originally in a sleep or hibernate state. Three beeps indicate that the laptop 16 is outside the wireless range of a corresponding platform management device.

A motion sensor 116, for example, an accelerometer is configured to determine when the laptop 16 is being moved. In application, when the laptop 16 is moved, the motion sensor 116 sends a corresponding signal to the firmware running on the processor 102. In response to such signals, the processor 102 sends applicable signals to the audio module 115, causing the audio module to provide an audible signal (e.g. beep) indicating that the laptop 16 is being moved. Alternatively, in response to the motion signal provided by the motion sensor 116, the processor 102 sends an applicable signal to the visual indication device 119, for example, an LED which causes the LED 119 to provide a visual warning that the laptop 16 is being moved.

The I/O controller 118 is configured to control the transfer of information between a plurality of input devices, for example, a mouse 121, a keyboard, joystick or other peripheral input device 122 and a biometric sensor 123, for example, a finger print reader, and an applicable output device, for example, a printer (not shown) and transfer of information between the input devices and the processor 102. The I/O controller 118 is also configured to provide information and data to the transceiver 108 for communication to devices remote from the laptop 16.

The USB port 124 is configured to receive a corresponding USB connector from an external device, for example, the platform management device of the present invention or a standard USB memory device. In an alternate embodiment, the USB port 124 may also be a Smart Card reader port.

Figure 3:
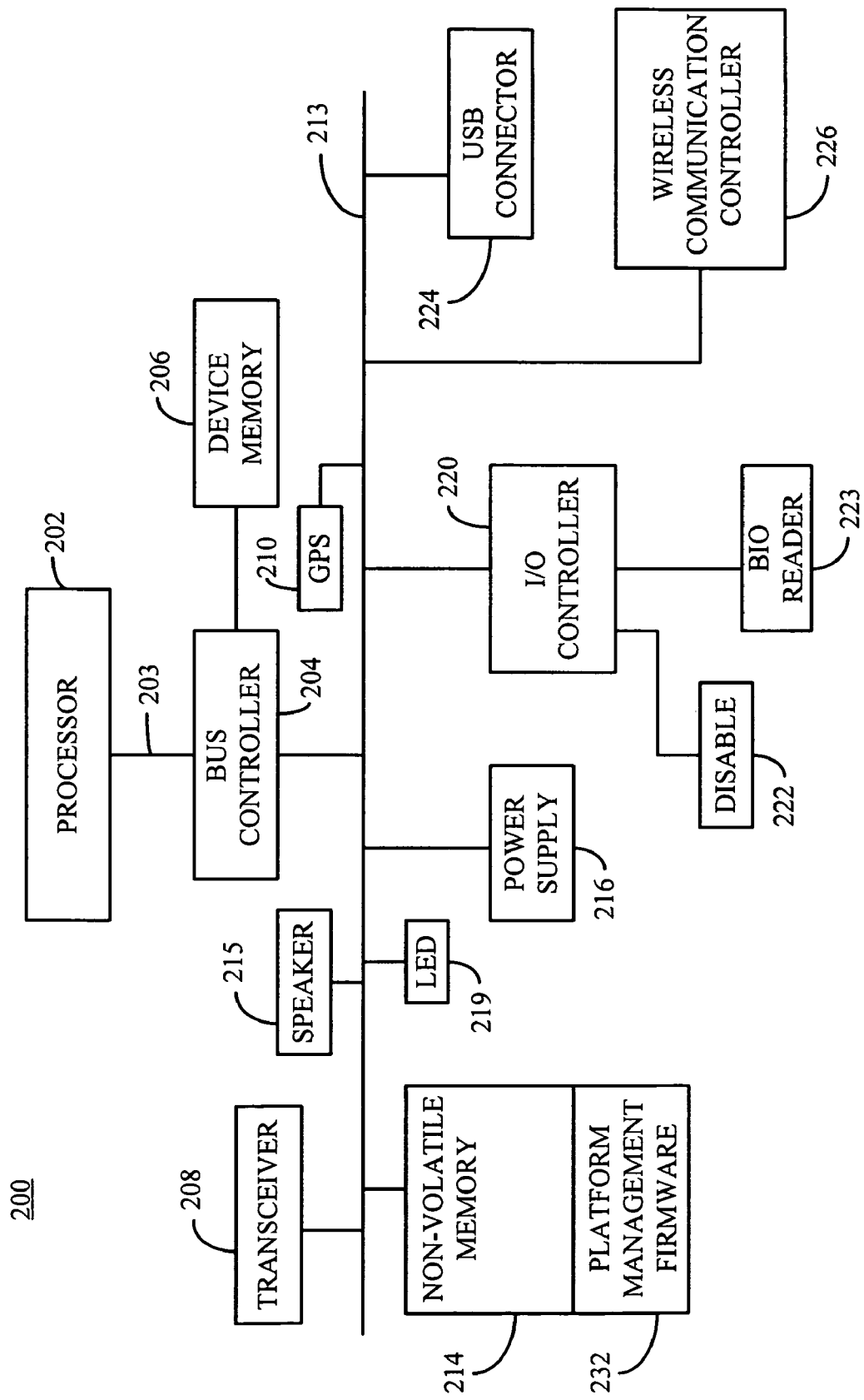
FIG. 3 is a schematic block diagram of the platform management device of the present invention.

FIG. 3 is a schematic block diagram of the platform management device 200 of the present invention. For purposes of illustration and not limitation, the platform management device 200 may be housed within an enclosure having a footprint comparable to that of a standard USB device. Although all device enclosures housing the components described herein are contemplated by the present disclosure and fall within the spirit and scope of the present invention. The platform management device 200 includes a processor or controller 202 configured to control the overall operation of the device 200.

The processor 202 may include an ALU for performing computations, for example, signal strength calculations, one or more registers for temporary storage of data and instructions, and a controller for controlling the operations of the platform management device 200. The processor 202 is not limited to microprocessors, but may take on other forms such as microcontrollers, digital signal processors, dedicated hardware (e.g. ASIC), state machines or software executing on one ore more processors distributed across a network.

The processor 202 is coupled to a bus controller 204 by way of a device bus 203. The bus controller 204 may include a memory included therein operative to provide access to device memory 206, for example, s synchronous dynamic random access memory.

The bus controller 204 is connected to a device bus 213, for example an ISA bus or other suitable communication medium. Coupled to the device bus 213 is a transceiver 208, a GPS signal generator 210, a speaker or other audio device 215, a non-volatile memory 214, for example, a Non-volatile flash memory, a power supply 216, a visual indicator 219, for example, an LED, an I/O controller 220, a Disable button 222, a USB connector 224 and a wireless communication controller 226.

The transceiver 208 may be implemented by any suitable device capable of detecting, establishing and transmitting and receiving data and other information over a network. For example, the transceiver 208 may be a USB-based communication device, or a Bluetooth enabled device capable of providing a connection to a Bluetooth network. Other data link connection protocols, for example, RFID may also be employed or otherwise utilized by the transceiver 208.

The GPS signal generator 210 may be any suitable transponder capable of providing a location signal over a network. Alternatively, the GPS signal generator 210 may provide its last known location, and the location of a corresponding laptop 16 (FIG. 2) to an enterprise server for further processing and handling.

The audio device 215 may be any speaker or other suitable device capable of providing an audible warning (e.g. beep) to a user. The audible warning may be provided, for example, when the underlying platform, for example, a provisioned laptop computer is moved; when the distance between the platform management device 200 and the corresponding provisioned laptop exceeds a predetermined distance; or to inform the user of the operating state of the platform management device 200. For example, when the audio device 215 provides a single beep or other suitable indication signal, the platform management device 200 is disabled. Two beeps indicate that the platform management device 200 is enabled, for example, after a successful fingerprint read from the biometric reader 223. Three beeps indicate that the distance between the platform management device 200 and the corresponding laptop or other suitable device exceeds a predetermined threshold. For example, the audio device 215 will provide three beeps when the provisioned laptop is leaving the wireless range of the corresponding platform management device.

The non-volatile memory 214 may be any suitable memory, for example a non-volatile flash memory that maintains the contents stored therein during low power or power off states of the underlying device. Within the non-volatile memory 214 is the platform management firmware 232 which when executed by the processor 202 causes the processor 202 to provide the functionality of the platform management device 200. A portion of the platform management firmware 232 is maintained in the hard disk or other non-volatile memory of a provisioned laptop computer or other suitable device, such that the combined firmware modules 132, 232 provide for the secure provisioning and operation of the present invention. Moreover, the firmware 232 includes some of the firmware 132 of the provisioned laptop, such that, the provisioned laptop may be prevented from operating when the platform management device 200 is out of transmission range. The functionality provided by the firmware will be described in greater detail with respect to FIGS. 4-5.

The power supply 216 may be any suitable device capable of providing at least eight hours of connectivity time and at least seven days of stand-by or non-connected time. An example of such a power supply would be a Li-ON battery or a nickel metal hydride battery. In an alternate embodiment, the power supply 216 may be implemented by a rechargeable battery or similar component.

The visual indicator 219 may be implemented, for example, by a light emitting diode (LED) or any suitable device capable of providing a visual warning in response to a command or state of the platform management device 200. For example, a green LED indicates that a successful fingerprint read has occurred. A red LED indicates that an unsuccessful fingerprint read has occurred. A flashing amber LED indicates that the platform management device 200 is in a low power state. Any number of additional color indicators may be presented to provide an indication of the state of the platform management device 200.

The I/O controller 220 is configured to control the transfer of information between a plurality of input devices, for example, Disable button 222 and biometric reader 223, and other peripheral devices (not shown) and/or a corresponding laptop computer. The Disable button 222 is used to control whether the corresponding provisioned laptop 16 is disabled or not, as well as controlling the operating state of the platform management device 200. For example, when the Disable button 222 is depressed, the corresponding laptop 16 is placed in a disabled state. This may be accomplished, for example, by the platform management device 200 sending the corresponding laptop 16 a signal including commands that cause the system firmware 130 (FIG. 2) of the laptop 16 to prevent the underlying hardware subsystems and components from running; thereby, preventing any software from being executed by the provisioned laptop. In an alternative embodiment, when the Disable button 222 is depressed, the system firmware of the laptop will prevent the provisioned laptop from booting up or recovering from a low power or suspended state. When in a disabled state, the LED 219 on the platform management device 200 will blink red.

Once in the disabled state, an authorized user will have the ability to enter a key word to re-enable the provisioned laptop 16. Alternatively, the user can swipe their fingerprint over the biometric reader 223 to re-enable the provisioned laptop 16. Re-enabling the provisioned laptop 16 from a restricted or disabled state requires that the platform management device 200 be either coupled to the USB or corresponding port 124 (FIG. 2) of the provisioned laptop 16 or be within wireless range of the provisioned laptop 16. When the provisioned laptop is re-enabled, the LED 219 will blink green, as well as two beeps being provided by the speaker 215.

The biometric reader 223 may be any suitable fingerprint reader or corresponding biometric scanning device operable to transfer some biometric information relating to the user to the processor 202 for authentication. In application, the platform management device 200 is associated with an individual user. The user may be authenticated through either a password or, for example, their fingerprint. In application, the fingerprint profile of the authorized user is stored in the non-volatile memory 214 of the platform management device 200. When a user wants to activate the management device 200, they swipe one of their fingers over the biometric reader 223. The captured image or other required biometric data is transferred to the processor 202, which determines whether the captured fingerprint information is associated with an the authorized user by comparing the captured fingerprint information with the biometric information stored in the non-volatile memory 214. If the captured and stored biometric information match, the LED 219 will flash green and the user will be able to use the platform management device 200; thereby, allowing the user to have access to and use the corresponding provisioned laptop 16. On the other hand, if the captured and stored biometric information do not match, the LED 219 will flash red and access to the platform management device and the corresponding provisioned laptop 16 will be denied.

Referring briefly to FIG. 2, in those situations where the laptop 16 is disabled, any attempt to move the laptop 16 will cause the accelerometer or motion detector 116 to sense the movement. When movement occurs, the accelerometer 116 will send a corresponding signal, for example, to the speaker 115; thereby, causing the speaker to provide an audible warning, for example, three beeps alerting the user and others in the surrounding area that the laptop 16 is being moved. Additionally, the accelerometer 116 may send a signal to the LED 119, causing it to provide a visual warning that the laptop 16 is being moved.

Returning to FIG. 3, the wireless communication controller 226 may be implemented as a Bluetooth, Wireless USB or Wireless RFID chip capable of detecting and providing a connection to one of the aforementioned data links or combinations thereof. In this manner, the platform management device 200 may connect to a corresponding provisioned laptop through a wireless communication medium.

The USB connector 224 is used to provide a direct connection between the platform management device 200 and the USB port (124 FIG. 2) on a corresponding provisioned laptop computer. In this manner, the platform management device 200 may connect to a corresponding laptop through a physical communication medium.

Figure 4:
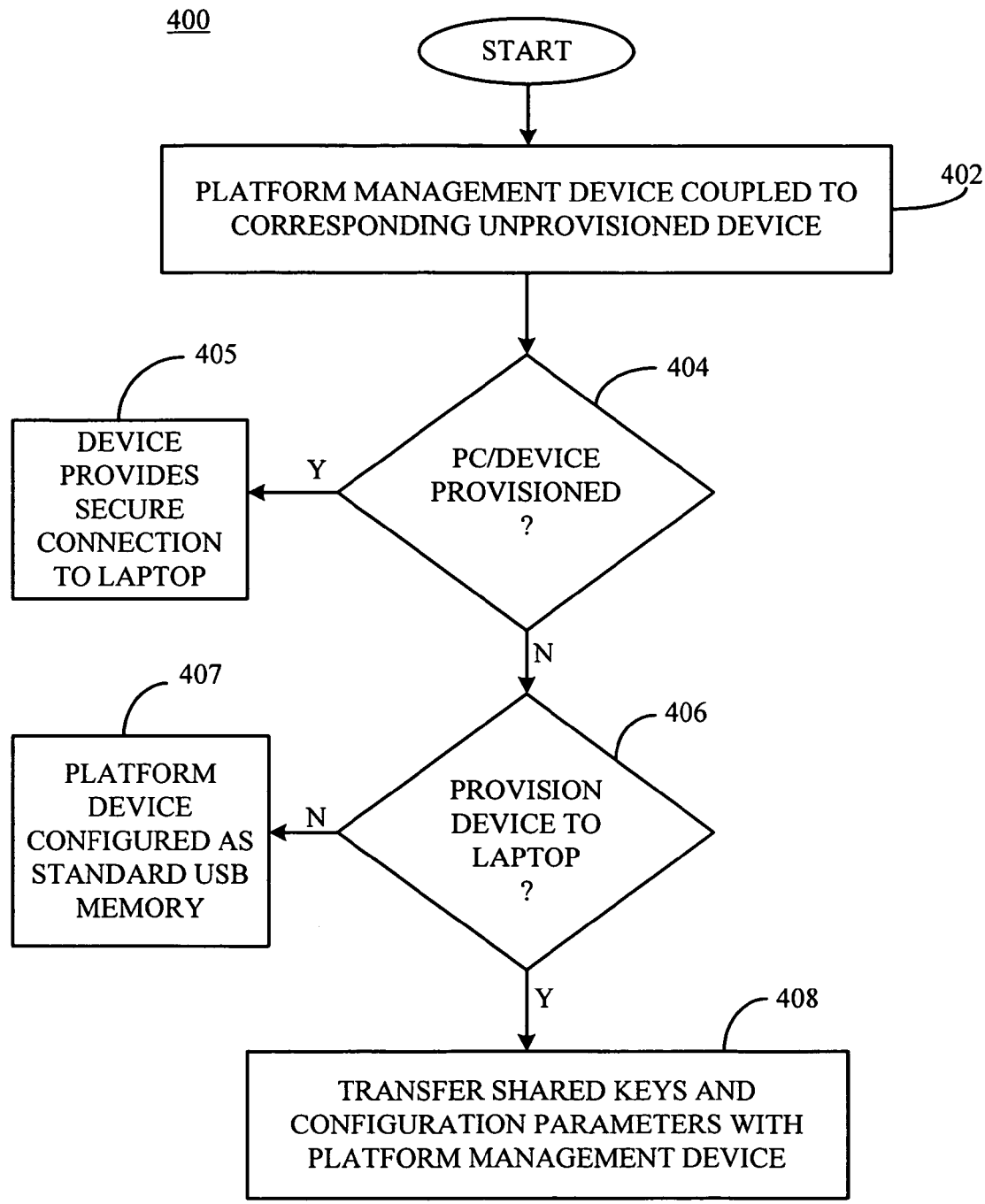
FIG. 4 is a flow chart illustrating the steps performed by the platform management device and a corresponding electronic device when such device is being provisioned.

FIG. 4 is a flow chart illustrating the steps performed by the platform management device and a corresponding laptop when the laptop is being provisioned to work in conjunction with the platform management device. Provisioning is the process of coupling a platform management device to a corresponding laptop computer. The provisioning can be accomplished through a direct interconnection of the USB connector of the platform management device to a corresponding USB port of the laptop computer. Alternatively, the interconnection can be accomplished wirelessly through the corresponding transceivers 108, 208 of the respective devices. Notwithstanding the connection mechanism, the following steps are performed to provision the device. The method begins with step 402 and continues through step 408.

In step 402, the platform management device is coupled to a corresponding unprovisioned system. This may be accomplished by platform management device being physically connected to the USB port of the unprovisioned system, or wirelessly connected to the unprovisioned system via the corresponding transceiver.

In step 404, a determination is made as to whether the laptop computer is provisioned to the coupled platform management device. This may be accomplished, for example, by asking the user or determining if the firmware located in both the platform management device and corresponding laptop are authorized and associated. If the laptop and the platform management device are provisioned, the process moves to step 405, where the platform management device provides a secure connection to the laptop, with the laptop subsequently engaging in normal operations. If the laptop is not provisioned to the coupled platform management device, the process moves to step 406.

In step 406, a determination is made as to whether the particular platform management device coupled to the laptop should be provisioned to the laptop. This may be accomplished, for example, by asking the user to authorize the provisioning. If the provisioning is not authorized, the process moves to step 407. Otherwise, the process moves to step 408.

In step 407, the platform management is configured to act as a standard USB device, for example, a USB memory device. In this situation, the non-volatile and device memory of the platform management device are used for standard user storage. The device will not be used to provide any authentication or control over the laptop.

In step 408, the laptop transfers a command sequence and corresponding configuration parameters to the management device; thereby, authenticating the device and authorizing it to act as a controller for the laptop. As of this point, the coupled platform management device is provisioned to the corresponding computer. At this time, a set of symmetric keys are generated and exchanged between the laptop and the platform management device to allow for the operation of the secure protocol between the laptop and the platform management device. These keys may be either AES keys of a specific width or 3DES keys of a specific width. However, any standard symmetric encryption algorithm may be used. Thus, the laptop will only be enabled upon activation by the specific platform management device. In this manner, two-factor authentication will now be necessary to enable the laptop: interconnection to the associated platform management device and biometric and/or password authentication by the user. The provisioning process then ends.

One of the benefits provided by using the provisioned platform management device of the present invention is that when the laptop is either lost or stolen, the authorized user of the laptop will more than likely have the platform management device, while the thief/finder will have the laptop. If the authorized owner requests, for example, by entering an applicable combination of button pushes the management device will transmit the last known location of the laptop via cellular data or SMS using a Bluetooth connection of the user's cellular phone. This may be accomplished, for example, by the transceiver of the platform management device detecting the user cellular phone and connecting to the Bluetooth or other suitable network that the cellular phone is connected to. Alternately, the user may plug the platform management device into any personal computing device and run a program stored within the device memory to transmit the location data to a predetermined location, for example, a server operated by the company that the user works for.

Another feature that may implemented on a provisioned laptop by the platform management device is forcing the laptop into a standby, hibernate or other power saving mode. This may be accomplished by configuring the provisioned laptop to enter one of the aforementioned power saving states when the Disable button is depressed. The actual functions performed by the laptop when the Disable button is depressed are dependent upon the configuration parameters that are shared by both the provisioned laptop and the corresponding platform management device during the provisioning process.

The communication between the provisioned laptop and the platform management device will now be described. The transceivers of the provisioned laptop and the platform management device use one or more data-link protocols, for example, Bluetooth, USB, RFID to communicate with one another and to communicate to an enterprise server. In some of these protocols, the data-link is always available on contact or within wireless range of the devices. Other protocols, for example, Bluetooth, require explicit pairing which may be performed as part of provisioning, which is discussed above in greater detail with respect to FIG. 4. When a data-link is available, the transceivers of the provisioned laptop and the platform management device run a secure transport on top of the data-link. This secure transport takes upper level protocol messages and encrypts them before transmission. Upon receipt, the encrypted messages are decrypted before executing the upper level protocol messages.

Encryption may be performed, for example, by or using any general purpose symmetric algorithm. The key, for example the shared key (step 408 of FIG. 4), is exchanged during provisioning and may be refreshed after a number of messages have been exchanged. Protocol message include, but are not limited to those illustrated in Table A, below.

TABLE A

| | |
|---|---|
| <seq> EXCHANGE -KEY | Seq is the command sequence no. |
| <key-width> <key data > | Propose new key for encryption. |
| <seq> KEY-CONFIRMED | Acknowledgement to previous |
| <key-width> <key-data> | command |
| <seq> DISABLE | Disable the electronic device (e.g. laptop) |
| <seq> DISABLE-CONFIRMED | Acknowledgement to previous command |
| <seq> ENABLE | Enable the electronic device (e.g. laptop) |
| <seq> ENABLE-CONFIRMED | Acknowledgement to previous command |
| <seq> TRANSFER-FIRMWARE <size><firmware bytes> | Send <size> bytes of firmware |
| <seq> TRANSFER-CONFIRMED | Acknowledgement to previous command |
| <seq> TRANSFER FAILED | Negative acknowledgement to previous command |

In addition, the platform management device supports a full USB protocol and, as discussed above, may be implemented as a mass storage USB device depending on whether the platform management device is authorized to be provisioned to a particular laptop.

The foregoing detailed description of the invention has been provided for the purposes of illustration and description.

Although an exemplary embodiment of the present invention has been described in detail herein with reference to the accompanying drawings, it is to be understood that the invention is not limited to the precise embodiment(s) disclosed, and that various changes and modifications to the invention are possible in light of the above teachings.

The invention claimed is:

1. A platform management device, comprising:
one or more non-transitory computer readable storage mediums storing one or more sequences of instructions, which when executed, cause:
transmitting operating parameters to a corresponding electronic device configured to read the operating parameters, wherein the operating parameters include a disable command,
wherein the corresponding electronic device comprises firmware to initialize and configure underlying hardware subsystems, the firmware causing the corresponding device to enter and maintain a disabled state that prevents the underlying hardware subsystems from running when (a) the disable command instructs the corresponding electronic device to enter the disabled state or (b) the corresponding electronic device does not receive the operating parameters after a predetermined event,
wherein the corresponding electronic device, upon being powered on, enters the disabled state, and
wherein the corresponding electronic device may only transition from the disabled state to an enabled state upon the corresponding electronic device (a) determining that a user of the corresponding electronic device is authenticated and (b) determining that the platform management device is physically connected to the corresponding electronic device; and
upon the platform management device determining that the corresponding electronic device is not provisioned with the platform management device, the platform management device exchanging a set of security keys with the corresponding electronic device to establish the platform management device authority to act as a controller for the corresponding electronic device.

2. The platform management device of claim 1, further including a biometric reader operative to authenticate a user, and wherein the operating parameters further includes authentication data, generated using the biometric reader, which indicates whether the user is authenticated.

3. The platform management device of claim 2, further including an audio device operative to provide an audible warning when the user is not authenticated.

4. The platform management device of claim 2, further including a visual indicator operative to provide a visual warning when the user is not authenticated.

5. The platform management device of claim 1, wherein the disabled state includes one member of the group consisting of: standby, low power, keyboard disable and monitor disable.

6. The platform management device of claim 1, wherein the platform management device causes the disable command to be generated when the distance from the corresponding electronic device to the platform management device exceeds a predetermined threshold value.

7. The platform management device of claim 1, further comprising:
a disable button, which when depressed, causes a disable command to be issued from the platform management device to the corresponding electronic device, wherein receipt of the disable command by the corresponding electronic device causes the corresponding electronic device to enter the disabled state.

8. The platform management device of claim 1, wherein the platform management device is configured to: upon determining that a button has been pressed on the platform management device, the platform management device transmitting to or displaying on a cellular phone a last known location of the corresponding electronic device.

9. A platform management device, comprising:
a storage device, and operating parameters stored on the storage device including a disable command, wherein a corresponding electronic device including firmware to initialize and configure underlying hardware subsystems, reads the operating parameters; and
a transmitter capable of transmitting the operating parameters to the corresponding electronic device,
wherein the firmware causes the corresponding electronic device to enter and maintain a disabled state wherein the underlying hardware systems are prevented from running when (a) the disable command instructs the corresponding electronic device to enter the disabled state or (b) the corresponding electronic device does not receive the operating parameters after a predetermined event,
wherein the corresponding electronic device, upon being powered on, enters the disabled state,
wherein the corresponding electronic device may only transition from the disabled state to an enabled state upon the corresponding electronic device (a) determining that a user of the corresponding electronic device is authenticated and (b) determining that the platform management device is physically connected to the corresponding electronic device, and
wherein the platform management device, upon determining that the corresponding electronic device is not provisioned with the platform management device, is configured to exchange a set of security keys with the corresponding electronic device to establish the platform management device authority to act as a controller for the corresponding electronic device.

10. A method for selectively enabling a device, comprising:
on a management device, storing operating parameters, wherein the operating parameters include a disable command;
transferring the operating parameters from the management device to a corresponding electronic device, the corresponding electronic device including firmware to initialize and configure underlying hardware subsystems,
wherein the firmware causes the electronic device to enter and maintain a disabled state wherein the underlying hardware subsystems are prevented from running when (a) the disable command instructs the corresponding electronic device to enter the disabled state or (b) the corresponding electronic device does not receive the operating parameters after a predetermined event,
wherein the corresponding electronic device, upon being powered on, enters the disabled state, and
wherein the corresponding electronic device may only transition from the disabled state to an enabled state upon the corresponding electronic device (a) determining that a user of the corresponding electronic device is authenticated and (b) determining that the platform management device is physically connected to the corresponding electronic device; and upon the management device determining that the corresponding electronic device is not provisioned with the management device, the management device exchanging a set of security keys with the corresponding electronic device to establish the management device authority to act as a controller for the corresponding electronic device.

11. The method of claim 10, further comprising:
the management device accessing biometric reader coupled thereto to determine whether a user is authenticated, and wherein the operating parameters further includes authentication data, generated using the biometric reader, which indicates whether the user is authenticated.

12. The method of claim 10, further comprising:
the management device accessing biometric reader coupled thereto to determine whether a user is authenticated; and
upon the management device determining that the user is not authenticated, issuing an audible warning to indicate the user is not authenticated.

13. The method of claim 10, further comprising:
the management device accessing biometric reader coupled thereto to determine whether a user is authenticated; and
upon the management device determining that the user is not authenticated, displaying a visual indicator to indicate the user is not authenticated.

14. The method of claim 10, wherein the disabled state includes one member of the group consisting of: standby, low power, keyboard disable and monitor disable.

15. The method of claim 10, further comprising:
the management device sending the disable command to the corresponding electronic device when a distance from the corresponding electronic device to the management device exceeds a predetermined threshold value.

16. The method of claim 10, further comprising:
upon determining that a disable button, resident on the management device, has been depressed, causing the disable command to be issued from the management device to the corresponding electronic device.

17. The method of claim 10, further comprising:
upon the management device determining that a button has been pressed on the management device, the management device transmitting to or displaying on a cellular phone a last known location of the corresponding electronic device.

18. A platform management device, comprising:
one or more non-transitory computer readable storage mediums storing one or more sequences of instructions, which when executed, cause:
transmitting operating parameters to a corresponding electronic device configured to read the operating parameters, wherein the operating parameters include a disable command,
wherein the corresponding electronic device comprises firmware to initialize and configure underlying hardware subsystems, the firmware causing the corresponding device to enter and maintain a disabled state that prevents the underlying hardware subsystems from running when (a) the disable command instructs the corresponding electronic device to enter the disabled state or (b) the corresponding electronic device does not receive the operating parameters after a predetermined event,
wherein the corresponding electronic device, upon being powered on, enters the disabled state,
wherein the corresponding electronic device may only transition from the disabled state to an enabled state upon the corresponding electronic device (a) determining that a user of the corresponding electronic device is authenticated and (b) determining that the platform management device is physically connected to the corresponding electronic device, and
wherein the corresponding electronic device comprises an accelerometer configured to determine when the corresponding electronic device is being moved, wherein the accelerometer, in response to determining the corresponding electronic device is being moved, instructs the firmware comprised on the corresponding electronic device to either emit an audible or visual signal to indicate that the corresponding electronic device is being moved.

19. A platform management device, comprising:
a storage device, and operating parameters stored on the storage device including a disable command, wherein a corresponding electronic device including firmware to initialize and configure underlying hardware subsystems, reads the operating parameters; and
a transmitter capable of transmitting the operating parameters to the corresponding electronic device,
wherein the firmware causes the corresponding electronic device to enter and maintain a disabled state wherein the underlying hardware systems are prevented from running when (a) the disable command instructs the corresponding electronic device to enter the disabled state or (b) the corresponding electronic device does not receive the operating parameters after a predetermined event,
wherein the corresponding electronic device, upon being powered on, enters the disabled state,
wherein the corresponding electronic device may only transition from the disabled state to an enabled state upon the corresponding electronic device (a) determining that a user of the corresponding electronic device is authenticated and (b) determining that the platform management device is physically connected to the corresponding electronic device, and
wherein the corresponding electronic device comprises an accelerometer configured to determine when the corresponding electronic device is being moved, wherein the accelerometer, in response to determining the corresponding electrical device is being moved, instructs the firmware comprised on the corresponding electronic device to either emit an audible or visual signal to indicate that the corresponding electronic device is being moved.

20. A method for selectively enabling a device, comprising:
on a management device, storing operating parameters, wherein the operating parameters include a disable command;
transferring the operating parameters from the management device to a corresponding electronic device, the corresponding electronic device including firmware to initialize and configure underlying hardware subsystems,
wherein the firmware causes the electronic device to enter and maintain a disabled state wherein the underlying hardware subsystems are prevented from running when (a) the disable command instructs the corresponding electronic device to enter the disabled state or (b) the corresponding electronic device does not receive the operating parameters after a predetermined event, wherein the corresponding electronic device, upon being powered on, enters the disabled state, and wherein the corresponding electronic device may only transition from the disabled state to an enabled state upon the corresponding electronic device (a) determining that a user of the corresponding electronic device is authenticated and (b) determining that the platform management device is physically connected to the corresponding electronic device;

an accelerometer determining when the corresponding electronic device is being moved; and in response to the accelerometer determining that the corresponding electronic device is being moved, the accelerometer instructing the firmware comprised on the corresponding electronic device to either emit an audible or visual signal to indicate that the corresponding electronic device is being moved.

* * * * *